US008559765B2

(12) United States Patent
Jain

(10) Patent No.: US 8,559,765 B2
(45) Date of Patent: Oct. 15, 2013

(54) SYSTEM AND METHOD FOR IMAGE STORAGE AND ANALYSIS

(75) Inventor: Deepa Jain, Gurgaon (IN)

(73) Assignee: International Business Machines Corporation, Armonk, NY (US)

(*) Notice: Subject to any disclaimer, the term of this patent is extended or adjusted under 35 U.S.C. 154(b) by 347 days.

(21) Appl. No.: 12/984,882

(22) Filed: Jan. 5, 2011

(65) Prior Publication Data
US 2012/0170854 A1 Jul. 5, 2012

(51) Int. Cl.
G06K 9/54 (2006.01)
G06K 9/62 (2006.01)
G06F 17/30 (2006.01)

(52) U.S. Cl.
USPC ............................. 382/305; 382/209; 707/705

(58) Field of Classification Search
USPC ......... 382/173, 218, 219, 232, 305, 312, 209; 707/705, 609
See application file for complete search history.

(56) References Cited

U.S. PATENT DOCUMENTS

| | | | |
|---|---|---|---|
| 5,915,250 A * | 6/1999 | Jain et al. ............................. | 1/1 |
| 6,006,232 A * | 12/1999 | Lyons ................................. | 1/1 |
| 6,115,717 A | 9/2000 | Mehrotra et al. | |
| 6,405,198 B1 | 6/2002 | Bitar et al. | |
| 6,549,913 B1 | 4/2003 | Murakawa | |
| 6,813,394 B1 * | 11/2004 | Matsumoto et al. ........... | 382/305 |
| 7,475,061 B2 * | 1/2009 | Bargeron et al. ...................... | 1/1 |
| 2005/0246388 A1 | 11/2005 | Yamatake | |
| 2006/0288006 A1 | 12/2006 | Eschbach et al. | |
| 2010/0119170 A1 | 5/2010 | Sengamedu et al. | |

FOREIGN PATENT DOCUMENTS

JP   2002132826 A   5/2002

OTHER PUBLICATIONS

Soffer, A. et al., "Two Data Organizations for Storing Images in a Rational Database System", Abstract. Proceedings of the IFIP TC2/WG2.6 Eighth Working Conference on Database Semantics—Semantic Issues in Multi Media Systems (1999). http://www.cs.umd.edu/~hjs/pubs/ds8.kap.pdf.
Rabitti, F. et al., "An Approach to Image Retrieval from Large Image Databases", Abstract, SIGIR '87 Proceedings of the 10th Annual Informational ACM SIGIR Conference on Research and Development in Information Retrieval. Copyright 1987 ACM 089791-232-2/87/0006/0284. http://delivery.acm.org/10.1145/50000/42037/p284-.

* cited by examiner

*Primary Examiner* — Kanjibhai Patel
(74) *Attorney, Agent, or Firm* — Ronald A. Kaschak; Keohane & D'Alessandro, PLLC

(57) ABSTRACT

An image storage and retrieval system is provided with means for matching and retrieving images based on image content, rather than image file names. In one embodiment, an image storing tool is configured to store an image in a relational database table. The image storing tool converts a compressed image back to the original image with the actual pixel values block-by-block until the entire image line as derived by the width has been decoded for one component or all interleaved components. In another embodiment, an image matching tool is configured to retrieve a stored image in a relational database table and return data values associated with the image. The image matching tool matches image content of an input image against each retrieved image in the relational database table on a line-by-line basis from top to bottom within the same image number and component number.

20 Claims, 7 Drawing Sheets

| IMAGE_NUMBER | COMPONENT_NUMBER | COMPONENT_TYPE | LINE_NUMBER | CUSTOMER_PICTURE |
|---|---|---|---|---|
| 1 | 1 | LUMEN | 1 | 43 46 49 97 99 105 46 39 |
|   |   |   | 2 | 43 46 49 97 99 105 46 39 |
|   |   |   | 3 | 43 46 49 97 99 105 46 39 |
|   |   |   | 4 | 43 46 49 97 99 105 46 39 |
| 1 | 2 | CHROME | 1 | 73 67 75 90 87 123 75 68 |
|   |   |   | 2 | 73 67 75 90 87 123 75 68 |
|   |   |   | 3 | 73 67 75 90 87 123 75 68 |
|   |   |   | 4 | 73 67 75 90 87 123 75 68 |
| 2 | 1 | LUMEN | 1 | 31 26 200 54 66 190 36 32 |
|   |   |   | 2 | 31 26 200 54 66 190 36 32 |
|   |   |   | 3 | 31 26 200 54 66 190 36 32 |
|   |   |   | 4 | 31 26 200 54 66 190 36 32 |

IMAGE_TEST 400

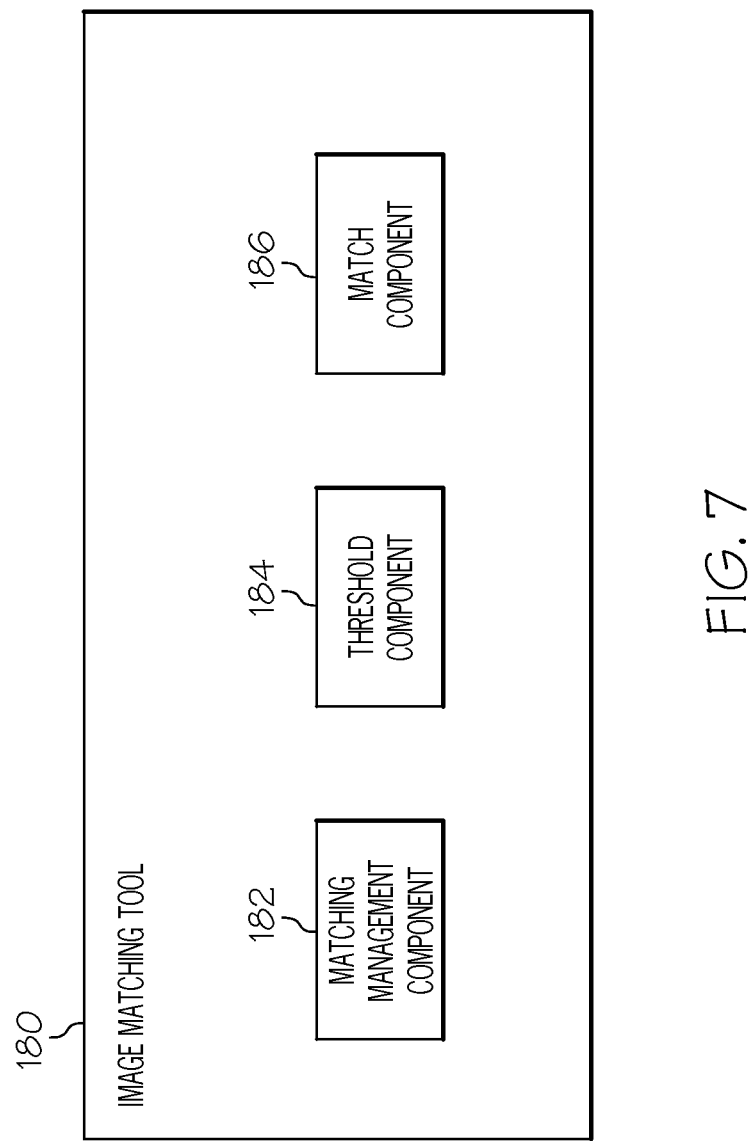

SYSTEM AND METHOD FOR IMAGE STORAGE AND ANALYSIS

FIELD OF THE INVENTION

This invention relates generally to image storage and more specifically to directly and efficiently storing and retrieving an image in a relational database management system.

BACKGROUND OF THE INVENTION

Databases provide a convenient means of storing vast amounts of information, allowing the information to be sorted, searched, viewed, and manipulated according to the needs of the user(s). Digital databases are managed using database management systems. A database management system (DBMS) consists of software that operates databases, allowing data creation, maintenance, search capabilities, and other access. A relational database management system (RDBMS) is a DBMS that is based on the relational model which adds the additional condition that the system supports a tabular structure for the data, with enforced relationships between the tables.

Various types of data may be stored in a database, including string data, numeric data, and dates. There are times when a user needs to store an image in a database. Today, an image is stored in database tables as a BLOB (Binary Large Object) field or as a link to an external file. In either case, the image can be queried based on the image file name and not the image contents. Furthermore, images stored as external file links cannot be processed using RDBMS capabilities and multiple images are difficult to maintain. A need exists for directly and efficiently storing an image so that it can be queried similar to a regular text field.

SUMMARY OF THE INVENTION

This disclosure describes a system and method for directly and efficiently storing an image and querying it like a regular text field. By using this system and having images stored directly in the database, the process of matching and retrieving images based on image content, rather than image file names, is made possible.

In one embodiment, there is a method for storing an image in a relational database table. In this embodiment, the method comprises: (a) receiving an image composed of a plurality of blocks arranged in a plurality of rows/columns, wherein each block is composed of a plurality of pixels arranged in a plurality of rows and a plurality of columns; (b) loading the image into a buffer; (c) retrieving a set of data from the image header including data related to a plurality of image components; (d) retrieving image pixel values relating to a component from a block of pixels on a pixel-by-pixel basis; (e) storing the image pixel values in a buffer on a row-by-row basis by appending the image pixel values to previously stored image pixel values in the buffer; (f) repeating steps (d) and (e) until the image pixel values for all blocks in the row have been retrieved and stored; (g) storing each row of image pixel values in the buffer as a row in the relational database table; and (h) repeating steps (d) and (g) until image pixel values for all pixel rows of the image have been retrieved and stored.

In a second embodiment, there is a computer system for storing an image in a relational database table. In this embodiment, the system comprises: at least one processing unit and memory operably associated with the at least one processing unit and an image storing tool storable in memory and executable by the at least one processing unit, wherein the image storing tool is operable to: (a) receive an image composed of a plurality of blocks arranged in a plurality of rows/columns, wherein each block is composed of a plurality of pixels arranged in a plurality of rows and a plurality of columns; (b) load the image into a buffer; (c) retrieve a set of data from the image header including data related to a plurality of image components; (d) retrieve image pixel values relating to a component from a block of pixels on a pixel-by-pixel basis; (e) store the image pixel values in a buffer on a row-by-row basis by appending the image pixel values to previously stored image pixel values in the buffer; (f) repeat steps (d) and (e) until the image pixel values for all blocks in the row have been retrieved and stored; (g) store each row of image pixel values in the buffer as a row in the relational database table; and (h) repeat steps (d) and (g) until image pixel values for all pixel rows of the image have been retrieved and stored.

In a third embodiment, there is a computer-readable medium storing computer instructions which, when executed, enables a computer system to store an image in a relational database table, the computer readable medium comprising: program code for causing a computer system to: (a) receive an image composed of a plurality of blocks arranged in a plurality of rows/columns, wherein each block is composed of a plurality of pixels arranged in a plurality of rows and a plurality of columns; (b) load the image into a buffer; (c) retrieve a set of data from the image header including data related to a plurality of image components; (d) retrieve image pixel values relating to a component from a block of pixels on a pixel-by-pixel basis; (e) store the image pixel values in a buffer on a row-by-row basis by appending the image pixel values to previously stored image pixel values in the buffer; (f) repeat steps (d) and (e) until the image pixel values for all blocks in the row have been retrieved and stored; (g) store each row of image pixel values in the buffer as a row in the relational database table; and (h) repeat steps (d) and (g) until image pixel values for all pixel rows of the image have been retrieved and stored.

In a fourth embodiment, there exists a method for deploying a system for storing an image in a relational database table. In this embodiment, a computer infrastructure is provided and is operable to: (a) receive an image composed of a plurality of blocks arranged in a plurality of rows/columns, wherein each block is composed of a plurality of pixels arranged in a plurality of rows and a plurality of columns; (b) load the image into a buffer; (c) retrieve a set of data from the image header including data related to a plurality of image components; (d) retrieve image pixel values relating to a component from a block of pixels on a pixel-by-pixel basis; (e) store the image pixel values in a buffer on a row-by-row basis by appending the image pixel values to previously stored image pixel values in the buffer; (f) repeat steps (d) and (e) until the image pixel values for all blocks in the row have been retrieved and stored; (g) store each row of image pixel values in the buffer as a row in the relational database table; and (h) repeat steps (d) and (g) until image pixel values for all pixel rows of the image have been retrieved and stored.

In a fifth embodiment, there is a method for retrieving a stored image in a relational database table and returning data values associated with the image, comprising: (a) retrieving the image pixel value data of an input image; (b) retrieving data relating to a plurality of predefined thresholds; (c) retrieving the image pixel value data of the stored image in the relational database table; (d) performing a matching process between the image pixel data of the input image and the image pixel data of the stored image in the relational database table using a matching algorithm; (e) returning data values relating to the stored image in the relational database table when any of the plurality of thresholds is reached; and (f) repeating steps (c) through (e) until the input image has been compared with all stored images in the relational database table.

In a sixth embodiment, there is a computer system for retrieving a stored image in a relational database table and returning data values associated with the image. In this embodiment, the system comprises: an at least one processing unit and memory operably associated with the at least one processing unit and an image matching tool storable in memory and executable by the at least one processing unit, the image matching tool configured to: (a) retrieve the image pixel value data of an input image; (b) retrieve data relating to a plurality of predefined thresholds; (c) retrieve the image pixel value data of the stored image in the relational database table; (d) perform a matching process between the image pixel data of the input image and the image pixel data of the stored image in the relational database table using a matching algorithm; (e) return data values relating to the stored image in the relational database table when any of the plurality of thresholds is reached; and (f) repeat steps (c) through (e) until the input image has been compared with all stored images in the relational database table.

In a seventh embodiment, there is a computer-readable medium storing computer instructions which, when executed, enables a computer system to retrieve a stored image in a relational database table and return data values associated with the image, the computer readable medium comprising: program code for causing a computer system to: (a) retrieve the image pixel value data of an input image; (b) retrieve data relating to a plurality of predefined thresholds; (c) retrieve the image pixel value data of the stored image in the relational database table; (d) perform a matching process between the image pixel data of the input image and the image pixel data of the stored image in the relational database table using a matching algorithm; (e) return data values relating to the stored image in the relational database table when any of the plurality of thresholds is reached; and (f) repeat steps (c) through (e) until the input image has been compared with all stored images in the relational database table.

In an eighth embodiment, there exists a method for deploying a system for retrieving a stored image in a relational database table and returning data values associated with the image. In this embodiment, a computer infrastructure is provided and is operable to: (a) retrieve the image pixel value data of an input image; (b) retrieve data relating to a plurality of predefined thresholds; (c) retrieve the image pixel value data of the stored image in the relational database table; (d) perform a matching process between the image pixel data of the input image and the image pixel data of the stored image in the relational database table using a matching algorithm; (e) return data values relating to the stored image in the relational database table when any of the plurality of thresholds is reached; and (f) repeat steps (c) through (e) until the input image has been compared with all stored images in the relational database table.

BRIEF DESCRIPTION OF THE DRAWINGS

These and other features of this invention will be more readily understood from the following detailed description of the various aspects of the invention taken in conjunction with the accompanying drawings in which:

FIG. 7 shows a more detailed view of an exemplary image matching tool shown in FIG. 1.

Figure 1:
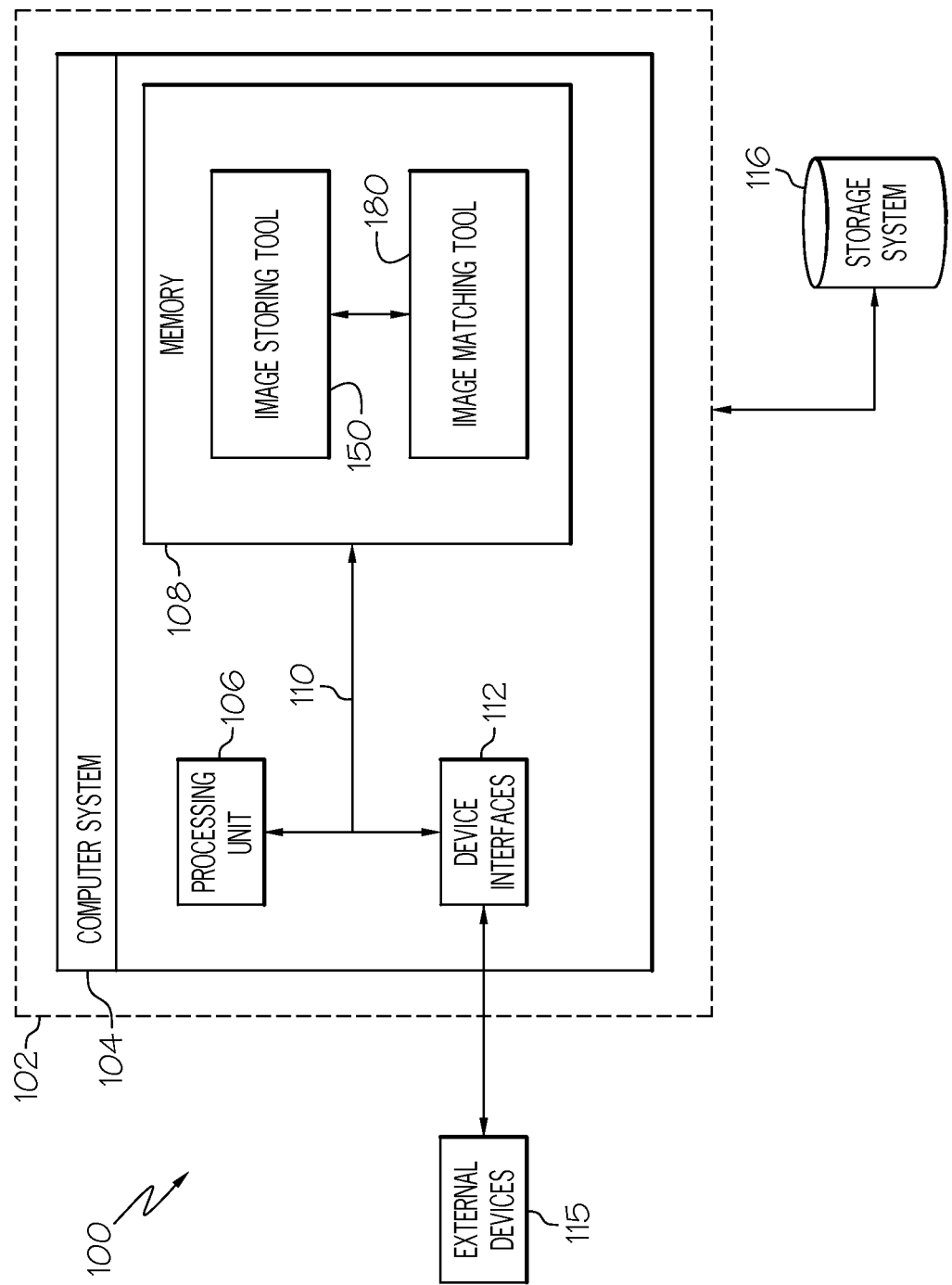
FIG. 1 illustrates a computerized implementation of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to directly and efficiently storing and retrieving an image in a relational database management system. Specifically, a storing tool is used to: (a) receive an image composed of a plurality of lines wherein each line composed of a plurality of blocks wherein each block is composed of a plurality of pixels arranged in a plurality of rows and a plurality of columns; (b) retrieve image pixel values of a block of a line on a pixel-by-pixel basis; (c) store the image pixel values of the block in an output buffer; (d) repeat steps (b) and (c) for each block until all blocks of the line are stored; (e) store the line of image pixel values in the relational database in a sequential line-by-line manner from the output buffer; and (f) repeat steps (b) through (e) for each line until all the lines of the image are stored.

Furthermore, an image matching tool is used to retrieve a plurality of images in a relational database table and match each of the plurality of images against an input image using the contents of the images rather than image file names. Specifically, the image matching tool is used to: (a) retrieve the image pixel value data of an input image; (b) retrieve data relating to a plurality of predefined thresholds; (c) retrieve the image pixel value data of the stored image in the relational database table; (d) perform a matching process between the image pixel data of the input image and the image pixel data of the stored image in the relational database table using a matching algorithm; (e) return data values relating to the stored image in the relational database table when any of the plurality of thresholds is reached; and (f) repeat steps (c) through (e) until the input image has been compared with all stored images in the relational database table.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for storing and/or retrieving an image according to the present invention. It should be understood that any other computers implemented under the present invention may have different components/software, but will perform similar functions. As shown, computer system 104 includes a processing unit 106, memory 108 for image storing tool 150 and image matching tool 180, a bus 110, and device interfaces 112.

Processing unit 106 collects and routes signals representing outputs from external devices 115 (e.g., a keyboard, a pointing device, a display, a graphical user interface, etc.) to image storing tool 150. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating image storing tool 150 and image matching tool 180, which is stored in memory 108 and/or storage system 116. While executing computer program code, processing unit 106 can read and/or write data to/from memory 108, and storage system 116. Storage system 116 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104. In one embodiment, storage system 116 is a database table which allows a user to copy image data from the table to other applications that support rows and columns, such as Microsoft Excel. Microsoft Excel is a registered trademark of Microsoft Corporation in the U.S. and other countries.

The image is stored with a field data type of 'Image'. The image structure makes it possible to do fast retrieval of an image stored in a database, as well as the process of matching an input image against images already stored in a database table. The input image could be external or an image stored in a separate table. An example image data type structure is shown below (Table 1).

TABLE 1

| # | Field Name | Field Data Type | Comments |
|---|---|---|---|
| 1 | Image_Number | Integer | Not visible. Unique Constraint part. |
| 2 | Component_Number | Integer | Not visible. Unique Constraint part. |

TABLE 1-continued

| # | Field Name | Field Data Type | Comments |
|---|---|---|---|
| 3 | Component_Type | Varchar2(10) | Not visible. Stores pre-defined values. Indexed. |
| 4 | Bits_Per_Pixel | Integer | Not visible. |
| 5 | Image_Height | Integer | Not visible. |
| 6 | Image_Width | Integer | Not visible. |
| 7 | Line_Number | Integer Not Null | Not visible. Incremental, starts from 1 for each component. Unique Constraint part. |
| 8 | Contents | Integer Not Null | Field visible in table description and display. Stores the image pixel values line by line. Field is named by the user. |

Figure 2:
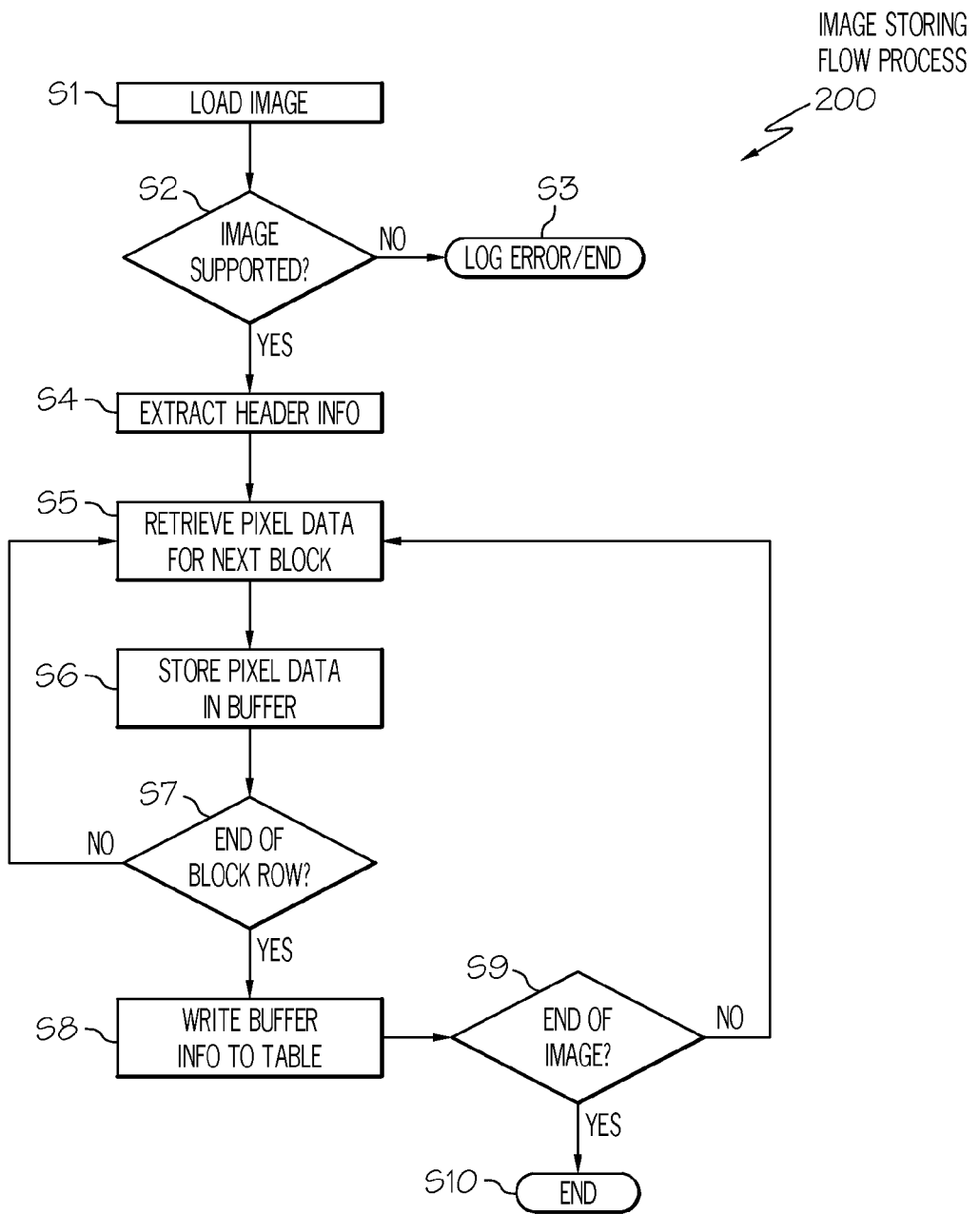
FIG. 2 shows a flow diagram of a process for storing an image in a relational database table.
Figure 3:
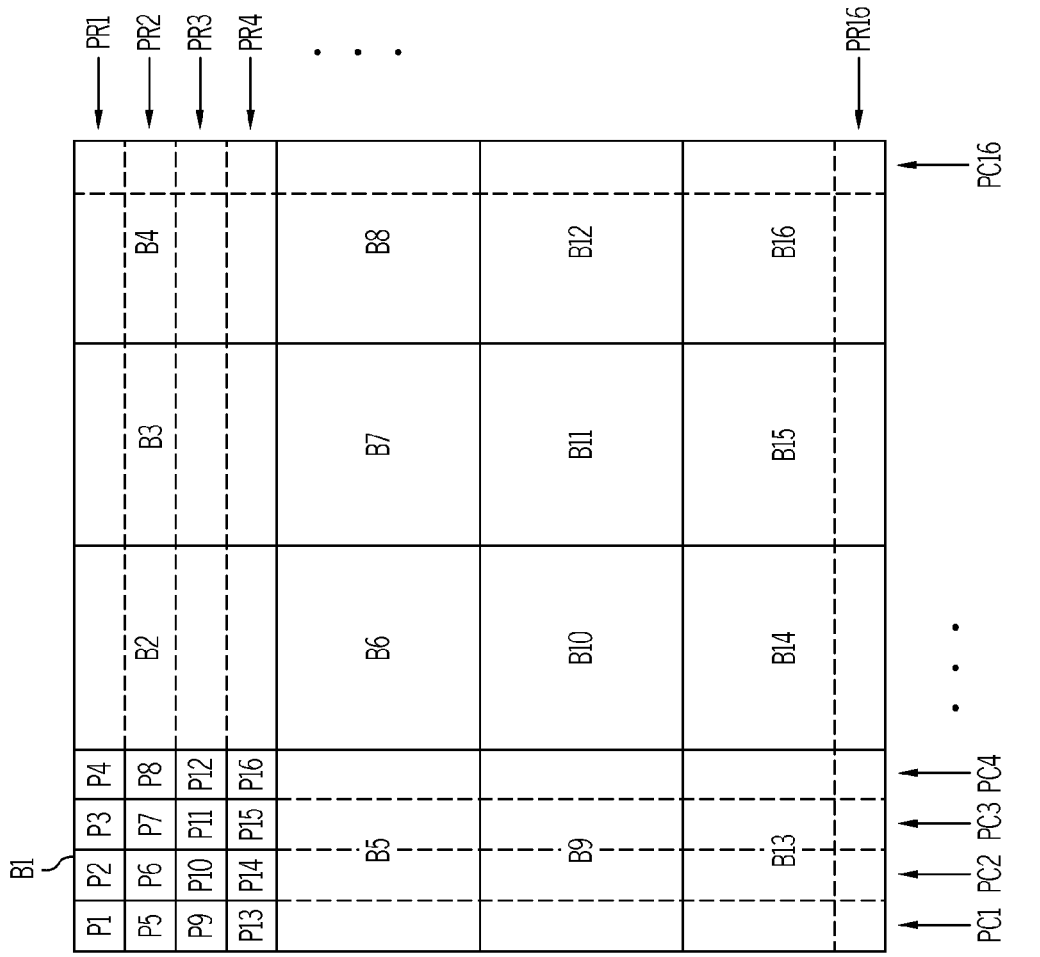
FIG. 3 shows an illustrative example of an image depicting the blocks of pixels of the image.

FIG. 2 and FIG. 3 help describe the steps of storing an image in a relational database table using the above image data type structure. FIG. 2 depicts an image storing process flow 200 in which elements of the present invention may operate. FIG. 3 depicts JPEG image 300 which is used as the example image when describing image storing process flow 200. The storage technique is demonstrated assuming an input image in the JPEG format. In JPEG, a block forming 8 rows by 8 columns of pixels (or at times 16-by-16 or 32-by-32 pixels are coded as a single unit). The proper name for one of these units is the MCU or Minimum Coded Unit. To simplify things, image 300 consists of 16 blocks (B1 through B16), with each block being formed by 4 rows by 4 columns of pixels. B1 depicts the matrix of pixels (P1 through P16) forming the block.

A table is created with a field data type as Image (e.g., using SQL command 'CREATE TABLE TEST_IMAGE CUSTOMER_PICTURE, IMAGE'). A query is written to store the image in the table (e.g., 'INSERT INTO TABLE TEST_IMAGE VALUE/home/test/image1.jpg'). As shown in FIG. 2, image 300 is loaded into the database buffer (S1). The image header is checked to determine whether the image is in a format supported by the process (S2). If the format is not supported, an error is logged and the process ends (S3). If the image is determined to be in a format that is supported, header information is extracted from the image (S4). Information extracted from the header includes, but is not limited to, bits per pixel, image height, image width, number of components, and component type.

Compressed JPEG image 300 is converted back to the original image with the actual pixel values MCU by MCU, or data unit by data unit, until the entire image has been decoded for one component or for all interleaved components. Uncompressing the image enables faster retrieval from the database table for matching purposes, which will be discussed in more detail below. Typically, images are available in compressed format as almost all image capturing devices produce compressed images, allowing for reduced disk space needs and faster transfer over a network.

The original image is recreated pixel-by-pixel (S5) for each block, beginning with blocks B1 through B4. The pixel values are retrieved for a component (e.g., 'Lumen', 'Chrome', etc.) for each pixel in the block. For images, every pixel has a lumen value ranging from 0 to 255 denoting the level of brightness of the pixel. The chrome value ranges from 0 to 255 and conveys color information of the image.

Block B1 is processed, followed by B2, B3, and B4. After B1 is processed, the pixel values for B1 are written to a buffer. After each of the remaining blocks in the current row of blocks is processed, the pixel values are concatenated to the values already stored in the buffer, so that the column length of the buffer increases but the number of lines in the buffer remains the same. The number of database rows stored for the image equals the number of pixel rows of the image. The width of the image field equals the number of pixel columns of the image.

After each block is processed, a check is made to determine whether all blocks in the current row of blocks has been processed (S7). After B1 through B4 are processed, the pixel values for the first four pixel rows of the image (PR1 through PR4) are written to the database table from the buffer (S8). The image number, component number, component type, and image line number fields are also populated. The image number is assigned a value, such as the highest existing image number in the database table plus one. Component type is populated as 'LUMEN', 'CHROME', etc. Component number is assigned a value of 1 to n, depending on the number of components. Image line typically will be a value from 1 to 8 (or 16 or 32). For FIG. 3, the image line will be a value from 1 to 4.

The process continues (S9) until all blocks of the image have been processed (S10). The image number and component number fields do not change for other lines from the same component. Image line number becomes a continuation for a component. In one embodiment, image number, component number, component type, bits per pixel, height, and width are set to a null value for all the lines of the image except for the first line to save disk space. For example, Image 300 has 16 pixel rows (PR1 through PR16) and 16 pixel columns (PC1 through PC16). Sixteen rows are stored in the database table (i.e., one database table row for each pixel row). The 'Contents' field of the image contents has a width of sixteen values (i.e., one value for each pixel column).

Figure 4:
FIG. 4 shows an illustrative example of two images stored in a relational database table.

FIG. 4 depicts two sample images stored in database table IMAGE_TEST 400. Image 1 is a color image having lumen and chrome components. Image 2 does not have chrome component pixel values because it is a gray scale image and not a color image. Both images are 4 rows by 8 columns of pixels, so that there are four database rows for each component and the contents field contains 8 pixel values per each row. Line numbers 2-4 contain the same values. The table is simplified for illustrative purposes and the 8 pixel values will likely be different for each line. The 'contents' field is named by the user (for example, 'Customer_Picture'). Only Image_Number, Component_Number, Component_Type, Line_Number, and Customer_Picture fields are shown in FIG. 4.

In one embodiment, Image_Number, Component_Number and Line_Number are parts of a unique constraint. A unique constraint is a single field or combination of fields that uniquely defines a record. Some of the fields can contain null values as long as the combination of values is unique.

It will be appreciated that image storing process flow 200 of FIG. 2 represents one possible implementation of storing an image in a relational database table, and that other process flows are possible within the scope of the invention. Image storing process flow 200 illustrates the architecture, functionality, and operation of possible implementations of systems, methods, and computer program products according to various embodiments of the present invention. In this regard, each portion of each flowchart may represent a module, segment, or portion of code, which comprises one or more executable instructions for implementing the specified logical function(s). It will also be noted that each block of the flowchart illustration can be implemented by special purpose hardware-based systems that perform the specified functions or acts.

Figure 5:
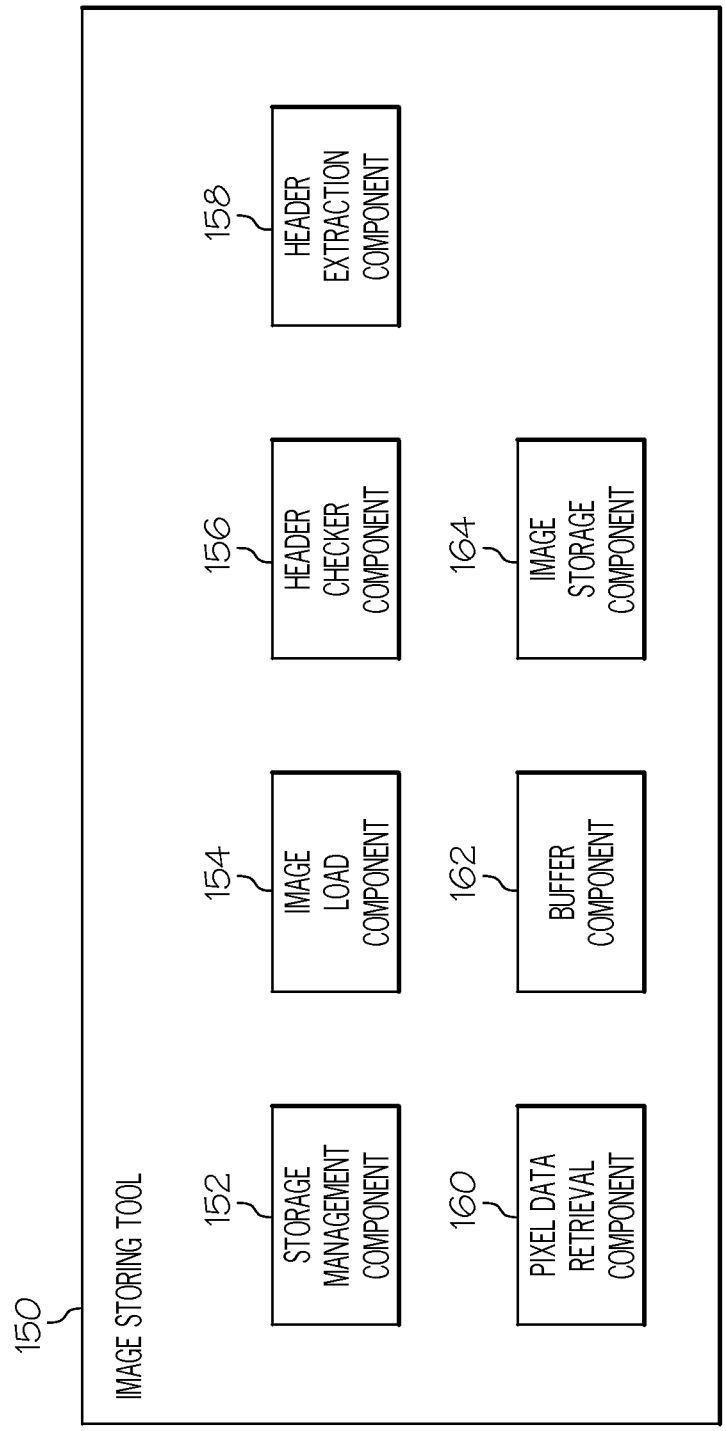
FIG. 5 shows a more detailed view of an exemplary image storing tool shown in FIG. 1

FIG. 5 shows a more detailed view of an exemplary image storing tool 150 shown in FIG. 1. Image storing tool 150 comprises storage management component 152, image load component 154, header checker component 156, header extraction component 158, pixel data retrieval component 160, buffer component 162, and image storage component 164.

Image load component 154 loads the local or remote image into a database buffer. Header checker component 156 checks the image header to determine whether the image file is a supported format. If so, header extraction component 158 extracts header information related to the image. Pixel data retrieval component 160 recreates the image pixel-by-pixel until the end of the first block. Buffer component 162 stores the pixel values in a buffer. Storage management component 152 determines whether the previous block processed was the last block in a row of blocks. If not, storage management component 152 notifies pixel data retrieval component 160 of the next block in the row to process.

After each row of blocks has been processed, storing component 164 stores the processed lines of pixel values in the table field 'Contents'. Header information values are also written to corresponding database table fields. Storage management component 152 is further configured to control repeating the reading and content storing process until the last line of the image is stored in the database table.

Image analytics is the science of analyzing images by the extraction of meaningful information from the images. Quick image retrieval based on image content, especially facial images, is in high demand today. For example, facial images of passengers at an airport could be captured and used by law enforcement officials to compare against a global database storing facial images of persons of interest. Having the ability to do this type of image storage, retrieval and matching would be an improvement over the current system in which people are incorrectly identified and detained on the basis of name similarities. In another example, name, phone, and address based complex matching algorithms are typically used to identify multiple records for a single customer for business intelligence and analytics purposes, especially in the banking and telecommunication sectors. Currently, issues arise in generating a single view of a customer through a standard method of matching of multiple customer details for multiple transactions, as these values are often incomplete and inconsistent. Creating a single view of the customer based on image analysis (Image Analytics) using the methods described in the present invention would assist in alleviating these issues.

Figure 6:
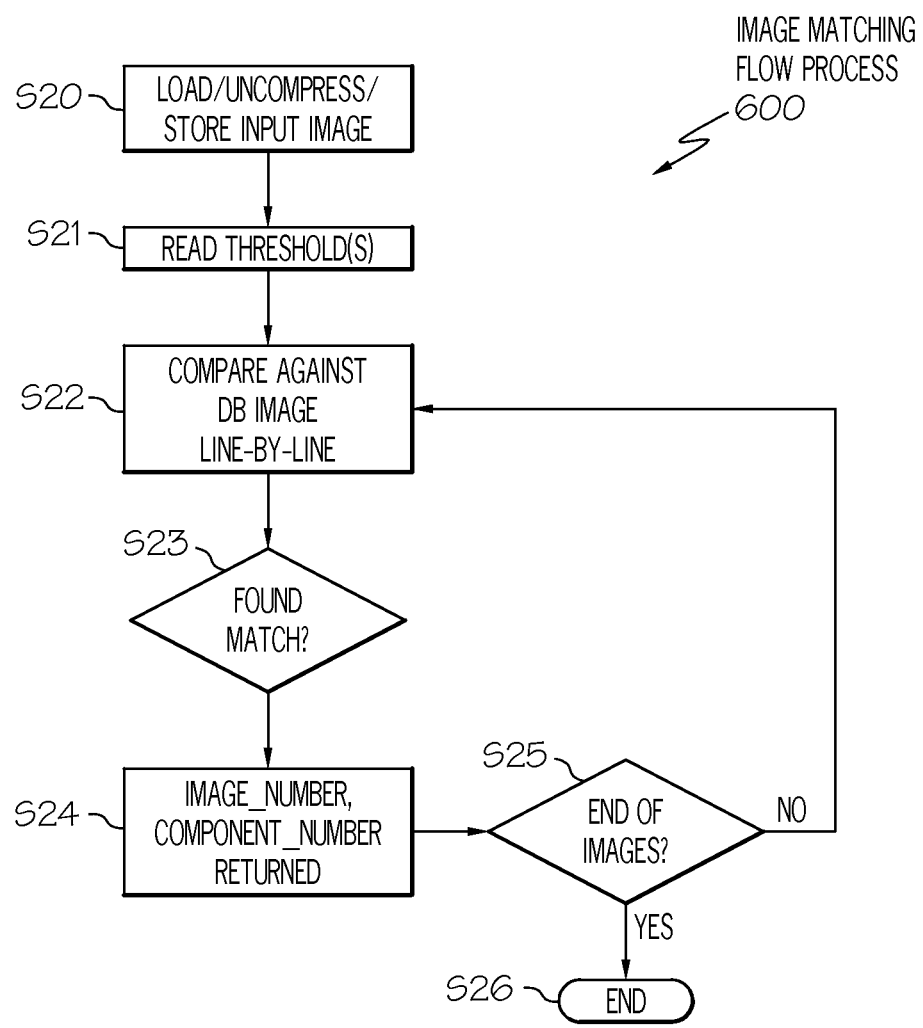
FIG. 6 shows a flow diagram of a process for matching an external image against a table of images.

FIG. 6 depicts an image matching process flow 600 in which elements of the present invention may operate. FIG. 6 shows a process for matching an external image against a table of a plurality of retrieved images stored in a relational database table. A query statement begins the search or retrieval. For example, 'SELECT * FROM IMAGE_TEST WHERE CUSTOMER_PICTURE LIKE/home/search/image1.jpg', where image1.jpg is an external file not currently stored in table IMAGE_TEST.

The external file (image1.jpg) is uncompressed and stored in a temporary table (e.g., TEMP_IMAGE) (step S20). When comparing images already uncompressed and stored in a table, there is no need to perform step S20. In one embodiment, one or more predefined thresholds are used to control the matching process. A pixel value threshold can be set for finding matches. For example, if the threshold is set to 2, two pixels are considered matched if the values differ by 2. Thus, a total deviation would be 5; 2 for the higher values and 2 for the lower values. In other words, if a stored pixel value is 10, then the five distinct values from 8 to 12 would be considered a match. Also, a pixel percentage threshold can be set. For example, a percentage of 90 would mean that two images are considered matched if the number of matching pixels is more than 90 percent. If no thresholds are defined, an exact match of pixel values must take place.

Any thresholds to be used when matching are read (S21). The indexed field 'Component_Type' plays a pivotal role in selective image searching. Images can be selectively searched based on the luminescence or chrominance components. For facial images, the luminescence component might suffice in many cases. The image content is searched line-by-line from top to bottom within the same Image_Number and Component_Number.

The first line of the image from table TEMP_IMAGE is taken and the pixel string is compared with the pixel strings stored in table IMAGE_TEST (S22). Also, a substring search is performed. In case of a substring match, the column/position of the substring is noted. Any character matching algorithm can be used to determine matches (S23). The matching process can run in parallel across multiple images in the table. The Image_Number and Component_Number fields are returned for matching images (S24). The process is repeated (S25) until all images in the table are matched against the input image (S26). If no matches are found, a message is returned.

FIG. 7 shows a more detailed view of an exemplary image matching tool shown in FIG. 1. Image matching tool 180 comprises matching management component 182, threshold component 184, and match component 186. In the cases when an external file is being used to match against images in a table, matching management component 182 calls image storing tool 150 to uncompress and store the image in a temporary table. After all images are stored in one or more tables having an identical data type structure, the searching/matching/retrieving process can begin.

Threshold component 184 retrieves all predefined thresholds which will be used during the matching and retrieval process. Match component 186 uses the threshold(s) when comparing the input image against the images stored in the database table. When comparing, the stored pixel values are compared line-by-line using a matching algorithm. If any of the predefined thresholds are met, the Image_Number and Component_Number of the image stored in the database table are returned.

Matching management component 182 determines whether the previous image compared against was the last image in the table. If not, matching management component 182 notifies match component 160 of the next image in the table to compare until all images in the table have been compared against the input image. If no matches are found, a message is returned.

It will be appreciated that image matching process flow 600 of FIG. 6 represents one possible implementation of a retrieving/matching an image in a relational database table, and that other process flows are possible within the scope of the invention. Image matching process flow 600 illustrates the architecture, functionality, and operation of possible implementations of systems, methods, and computer program products according to various embodiments of the present invention. In this regard, each portion of each flowchart may represent a module, segment, or portion of code, which comprises one or more executable instructions for implementing the specified logical function(s). It will also be noted that each block of the flowchart illustration can be implemented by special purpose hardware-based systems that perform the specified functions or acts.

Further, it can be appreciated that the methodologies disclosed herein can be used within a computer system to store and query an image in a relational database table. In this case, image storing tool 150 and image matching tool 180 can be provided, and one or more systems for performing the processes described in the invention can be obtained and deployed to computer infrastructure 102. To this extent, the deployment can comprise one or more of: (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on, that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Further, it can be appreciated that the methodologies disclosed herein can be used within a computer system to store and retrieve an image in a relational database table. In this case, image storing tool 150 and/or image matching tool 180 can be provided, and one or more systems for performing the processes described in the invention can be obtained and deployed to computer infrastructure 103. To this extent, the deployment can comprise one or more of: (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 105 may be described in the general context of computer-executable instructions, such as program modules, being executed by a computer. Generally, program modules include routines, programs, people, components, logic, data structures, and so on, that perform particular tasks or implement particular abstract data types. Exemplary computer system 105 may be practiced in distributed computing environments where tasks are performed by remote processing devices that are linked through a communications network. In a distributed computing environment, program modules may be located in both local and remote computer storage media including memory storage devices.

Furthermore, an implementation of exemplary computer system 104 or 105 may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for storing and retrieving an image in a relational database table. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for storing an image in a relational database table, comprising:
    (a) receiving an image composed of a plurality of blocks arranged in a plurality of rows/columns, wherein each block is composed of a plurality of pixels arranged in a plurality of rows and a plurality of columns;
    (b) loading the image into a buffer;
    (c) retrieving a set of data from the image header including data related to a plurality of image components;
    (d) retrieving image pixel values relating to a component from a block of pixels on a pixel-by-pixel basis;
    (e) storing the image pixel values in a buffer on a row-by-row basis by appending the image pixel values to previously stored image pixel values in the buffer;
    (f) repeating steps (d) and (e) until the image pixel values for all blocks in the row have been retrieved and stored;
    (g) storing each row of image pixel values in the buffer as a row in the relational database table; and
    (h) repeating steps (d) and (g) until image pixel values for all pixel rows of the image have been retrieved and stored.

2. The method according to claim 1, wherein the image is received in JPEG format.

3. The method according to claim 1, further comprising storing the set of data in the relational database table.

4. The method according to claim 1, wherein the set of data further includes bits per pixel, image height, and image width.

5. The method according to claim 1, wherein steps (d) through (h) are repeated for each component type retrieved from the image header.

6. A non-transitory computer-readable storage medium storing computer instructions which, when executed, enables a computer system to store an image in a relational database table, the computer instructions comprising:
    (a) receiving an image composed of a plurality of blocks arranged in a plurality of rows/columns, wherein each block is composed of a plurality of pixels arranged in a plurality of rows and a plurality of columns;
    (b) loading the image into a buffer;
    (c) retrieving a set of data from the image header including data relating to a plurality of image components;
    (d) retrieving image pixel values relating to a component from a block of pixels on a pixel-by-pixel basis;
    (e) storing the image pixel values in a buffer on a row-by-row basis by appending the image pixel values to previously stored image pixel values in the buffer;
    (f) repeating steps (d) and (e) until the image pixel values for all blocks in the row have been retrieved and stored;
    (g) storing each row of image pixel values in the buffer as a row in the relational database table; and
    (h) repeating steps (d) and (g) until image pixel values for all pixel rows of the image have been retrieved and stored.

7. The non-transitory computer-readable storage medium according to claim 6, wherein the image is received in JPEG format.

8. The non-transitory computer-readable storage medium according to claim 6, further comprising the step of storing the set of data in the relational database.

9. The non-transitory computer-readable storage medium according to claim 6, wherein the set of data further includes bits per pixel, image height, and image width.

10. The non-transitory computer-readable storage medium according to claim 6, wherein steps (d) through (h) are repeated for each component type retrieved from the image header.

11. The method for retrieving a stored image in a relational database table and returning data values associated with the image, comprising:
    (a) retrieving the image pixel value data of an input image;
    (b) retrieving data relating to a plurality of predefined thresholds;
    (c) retrieving the image pixel value data of the stored image in the relational database table;
    (d) performing a matching process between the image pixel data of the input image and the image pixel data of the stored image in the relational database table using a matching algorithm;
    (e) returning data values relating to the stored image in the relational database table when any of the plurality of thresholds is reached; and
    (f) repeating steps (c) through (e) until the input image has been compared with all stored images in the relational database table.

12. The method according to claim 11, wherein the input image and the plurality of images in the relational database table are JPEG format.

13. The method according to claim 11, wherein the data values returned includes image number and component number.

14. The method according to claim 11, wherein one of the plurality of thresholds is an allowable difference between two corresponding pixels.

15. The method according to claim 11, wherein one of the plurality of thresholds is a percentage of matching pixels.

16. A non-transitory computer-readable storage medium storing computer instructions which, when executed, enables a computer system to retrieve a stored image in a relational database table and return data values associated with the image, comprising:
    (a) retrieving the image pixel value data of an input image;
    (b) retrieving data relating to a plurality of predefined thresholds;
    (c) retrieving the image pixel value data of the stored image in the relational database table;

(d) performing a matching process between the image pixel data of the input image and the image pixel data of the stored image in the relational database table using a matching algorithm;
(e) returning data values relating to the stored image in the relational database table when any of the plurality of thresholds is reached; and
(f) repeating steps (c) through (e) until the input image has been compared with all stored images in the relational database table.

17. The non-transitory computer-readable storage medium according to claim 16, wherein the input image and the plurality of images in the relational database table are JPEG format.

18. The non-transitory computer-readable storage medium according to claim 16, wherein the data values returned includes image number and component number.

19. The non-transitory computer-readable storage medium according to claim 16, wherein one of the plurality of thresholds is an allowable difference between two corresponding pixels.

20. The non-transitory computer-readable storage medium according to claim 16, wherein one of the plurality of thresholds is a percentage of matching pixels.

* * * * *